United States Patent
Huang et al.

(10) Patent No.: US 12,181,726 B2
(45) Date of Patent: Dec. 31, 2024

(54) ANTI-TWIST STRUCTURE OF VOICE COIL MOTOR

(71) Applicant: Lanto Electronic Limited, Kunshan (CN)

(72) Inventors: Wen-Yen Huang, Kunshan (CN); Meng-Ting Lin, Kunshan (CN); Fu-Yuan Wu, Kunshan (CN); Shang-Yu Hsu, Kunshan (CN); Bing-Bing Ma, Kunshan (CN); Jie Du, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 273 days.

(21) Appl. No.: 17/326,682

(22) Filed: May 21, 2021

(65) Prior Publication Data

US 2021/0281724 A1     Sep. 9, 2021

(30) Foreign Application Priority Data

Dec. 18, 2020 (CN) .......................... 202011505170.7

(51) Int. Cl.
| | | |
|---|---|---|
| G02B 7/09 | (2021.01) | |
| G02B 7/00 | (2021.01) | |
| G02B 7/08 | (2021.01) | |
| G03B 3/10 | (2021.01) | |
| H02K 41/035 | (2006.01) | |

(Continued)

(52) U.S. Cl.
CPC .............. *G02B 7/003* (2013.01); *G02B 7/08* (2013.01); *G02B 7/09* (2013.01); *G02B 7/026* (2013.01); *G03B 2205/0069* (2013.01)

(58) Field of Classification Search
CPC . G03B 5/00; G03B 5/04; G03B 13/36; G03B 3/10; G03B 3/12; G03B 2205/0007; G03B 2205/0053; G03B 2205/0015; G03B 2205/0069; G03B 3/02; G03B 13/34; G03B 30/00; G02B 7/021; G02B 7/04; G02B 7/08; G02B 7/09; G02B 7/10; G02B 9/62; G02B 13/001; G02B 13/0065; G02B 27/646; H04N 5/2253; H04N 5/2254;

(Continued)

(56) References Cited

U.S. PATENT DOCUMENTS

| | | | |
|---|---|---|---|
| 2012/0146432 A1* | 6/2012 | Kim ........................ | G03B 3/10 310/12.16 |
| 2012/0300322 A1* | 11/2012 | Takashima ............... | G02B 7/08 359/825 |

FOREIGN PATENT DOCUMENTS

| | | |
|---|---|---|
| CN | 206020785 U | 3/2017 |
| CN | 207114854 U | 3/2018 |

* cited by examiner

*Primary Examiner* — Marin Pichler
(74) *Attorney, Agent, or Firm* — Birch, Stewart, Kolasch & Birch, LLP

(57) ABSTRACT

An anti-twist structure of voice coil motor includes a base, a lens housing, an elastic sheet, a magnet, and a yoke member. The lens housing has a margin wall, and the margin wall has a first protrusion and a contact portion. The elastic sheet has a hollowed slot, and the first protrusion pass through the hollowed slot, so that the elastic sheet is disposed on a portion of the margin wall and on the contact portion. The yoke member has an upper wall and a side wall. The side wall is disposed at one side of the upper wall and the side wall extends outward in a direction not parallel to the upper wall. The yoke member surrounds the lens housing, the elastic sheet, and the magnet. The lens housing has a deflectable angle relative to a horizontal reference line.

2 Claims, 9 Drawing Sheets

(51) Int. Cl.
*H04N 5/225* (2006.01)
*H04N 5/232* (2006.01)
*G02B 7/02* (2021.01)

(58) Field of Classification Search
CPC .. H04N 5/2257; H04N 5/23287; H02K 11/33; H02K 41/0356
USPC ....... 359/911, 554, 555, 557, 811, 813, 814, 359/823, 824, 872, 877
See application file for complete search history.

ANTI-TWIST STRUCTURE OF VOICE COIL MOTOR

CROSS-REFERENCE TO RELATED APPLICATION

This non-provisional application claims priority under 35 U.S.C. § 119(a) to Patent Application No. 202011505170.7 filed in China, P.R.C. on Dec. 18, 2020, the entire contents of which are hereby incorporated by reference.

BACKGROUND

Technical Field

The present disclosure relates to a field of optical lenses, and more specifically relates to an anti-twist structure of voice coil motor.

Related Art

Almost all current smart mobile devices are equipped with lens modules. Miniaturizing the lens module, driving the lens of the lens module to elevate, and zooming in/out are mainly achieved through a voice coil motor.

A voice coil motor generally includes a lens housing, a voice coil, a magnet, and a yoke member. Through receiving electrical signals by the voice coil, the voice coil interacts with the magnet, thereby driving the lens to move. However, when the lens is moving, such as when the lens is moving forward/backward in the Z direction, the lens may still be subjected to external forces or component forces caused by its own weight in other directions different from the Z direction. This results in deflections of the lens and the lens housing, for example, the lens and the lens housing may move towards the X direction or the Y direction.

When the lens housing is excessively deflected, the entire lens module may be stuck and cannot be moved upward/downward. Though a slight deflection will not affect the elevating function of the lens module, in a long-term perspective, the friction between the lens housing and the yoke member due to the deflection of the lens housing will produce abrasion debris, which can easily cause clogging and pollution problems, and even affect the operation of the lens module or the quality of image-capturing.

SUMMARY

In order to solve the aforementioned problem(s), a general embodiment of the present disclosure provides an anti-twist structure of voice coil motor. The anti-twist structure includes a base, a lens housing, an elastic sheet, a magnet, and a yoke member. The lens housing is connected to the base, and the lens housing has a margin wall. The margin wall has a first protrusion and a contact portion, and the contact portion is disposed at an outer periphery of the first protrusion. The elastic sheet has a hollowed slot, and the first protrusion passes through the hollowed slot so that the elastic sheet is disposed on a portion of the margin wall and on the contact portion. The magnet is disposed on the base and located at one side of the lens housing, and the magnet is connected to the elastic sheet. The yoke member has an upper wall and a side wall. The side wall is disposed at one side of the upper wall, and the side wall extends outward in a direction not parallel to the upper wall. The yoke member is connected to the base so that the yoke member surrounds the lens housing, the elastic sheet, and the magnet. The lens housing has a deflectable angle relative to a horizontal reference line, and the deflectable angle is an included angle between the lens housing and the horizontal reference line.

In some embodiments, the deflectable angle is not greater than 2.7 degrees.

In some embodiments, when the lens housing deflects from the horizontal reference line to a maximum value the deflectable angle, the first protrusion abuts against a bottom of the upper wall, and the contact portion abuts against the elastic sheet or the bottom of the upper wall at the same time, by which the lens housing and the yoke member interfere with each other.

In some embodiments, the lens housing has an inner flange, a groove is disposed between the inner flange and the first protrusion, and a first extension arm of the elastic sheet is disposed in the groove.

In some embodiments, a second protrusion is disposed on the contact portion. A height of the second protrusion is lower than a height of the first protrusion. When the lens housing deflects to a maximum value of the deflectable angle, the second protrusion abuts against the elastic sheet.

In some embodiments, the upper wall has a first wall, a connection wall, and a second wall. The connection wall extends from one side of the first wall in a direction parallel to the side wall, and the second wall extends from one side of the connection wall in a direction parallel to the first wall.

More specifically, in some embodiments, a second protrusion is disposed on the contact portion, and a height of the second protrusion is lower than a height of the first protrusion. When the lens housing deflects to a maximum value of the deflectable angle, the first protrusion abuts against a bottom of the first wall, the second protrusion abuts against the elastic sheet at the same time, and the elastic sheet abuts against a bottom of the second wall. Moreover, in some embodiments, a distance between the first protrusion and the first wall is 0.13 mm to 0.15 mm, and a distance between the second protrusion and the elastic sheet is 0.15 mm to 0.17 mm.

More specifically, in some embodiments, a second protrusion is disposed on the contact portion, and a height of the second protrusion is lower than a height of the first protrusion. A bump is disposed on the bottom of the second wall, and a height of the bump is lower than the height of the first protrusion. When the lens housing deflects to a maximum value of the deflectable angle, the first protrusion abuts against a bottom of the first wall, and the second protrusion abuts against the bump at the same time. Moreover, in some embodiments, the elastic sheet has a second extension arm located between the bump and the first protrusion. Furthermore, in some embodiments, the second extension arm is spaced apart from the bump.

In some embodiments, a bump is disposed on the bottom of the second wall, and a height of the bump is lower than the height of the first protrusion. When the lens housing deflects to a maximum value of the deflectable angle, the first protrusion abuts against a bottom of the first wall, and the bump abuts against the contact portion at the same time. Moreover, the elastic sheet has a second extension arm located between the bump and the first protrusion. Furthermore, in some embodiments, the second extension arm is spaced apart from the bump.

In can be understood that, according to one or some embodiments of the present disclosure, by having the first protrusion and the contact portion corresponding to the yoke member on the lens housing, the anti-twist structure of voice coil motor can limit the elevation of the lens or the deflectable angle θ when it is subjected to an external force.

Moreover, according to one or some embodiments of the present disclosure, with the elastic sheet, the lens housing can be quickly moved resiliently to its original position when a small angle deflection occurs, thereby ensuring the service life of the overall lens module.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
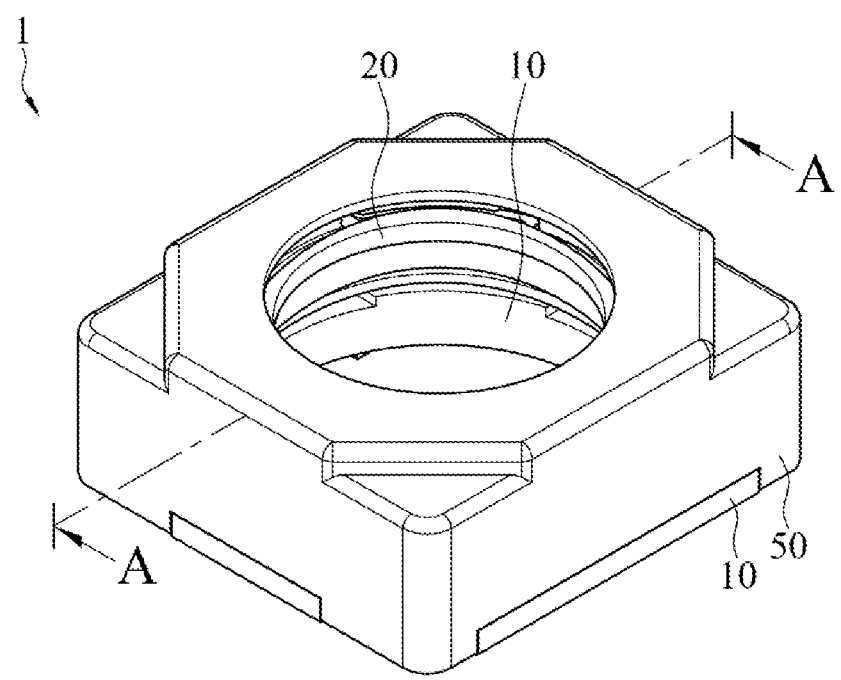
FIG. 1 illustrates a schematic perspective view of an anti-twist structure of voice coil motor according to the first embodiment of the present disclosure.

Hereinafter, the principle of structures and the principle of operation of the present disclosure will be described more fully with reference to the accompanying drawings. The present disclosure will be described more specifically with reference to the following embodiments. The drawings are to be regarded as illustrative in nature for explaining the detail of the present disclosure and not restrictive, the size of and ratios between elements shown in the drawings may be arbitrarily shown for better understanding, and the real ratio can be adjusted according to design requirements. It should be understood that when an element is referred to as being "on", "connected to", or "coupled to" another element, it may be directly on, connected to, or coupled to the other element or one or more intervening elements may also be present. On the contrary, when one element is referred to as being "directly on", "directly connected to", or "directly coupled to" another element, it can be clearly understood that there are no intervening elements between the two elements.

In addition, it will be understood that, although the terms "first", "second", "third", etc. may be used herein to describe various elements, components, regions, and/or sections, these terms are only used to distinguish these elements, components, regions, and/or sections, rather than are used to represent the definite order of these elements, components, regions, and/or sections. Moreover, spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. In other words, these terms only represents a relative position relationship between the described components, not an absolute position relationship between the described components.

Figure 2:
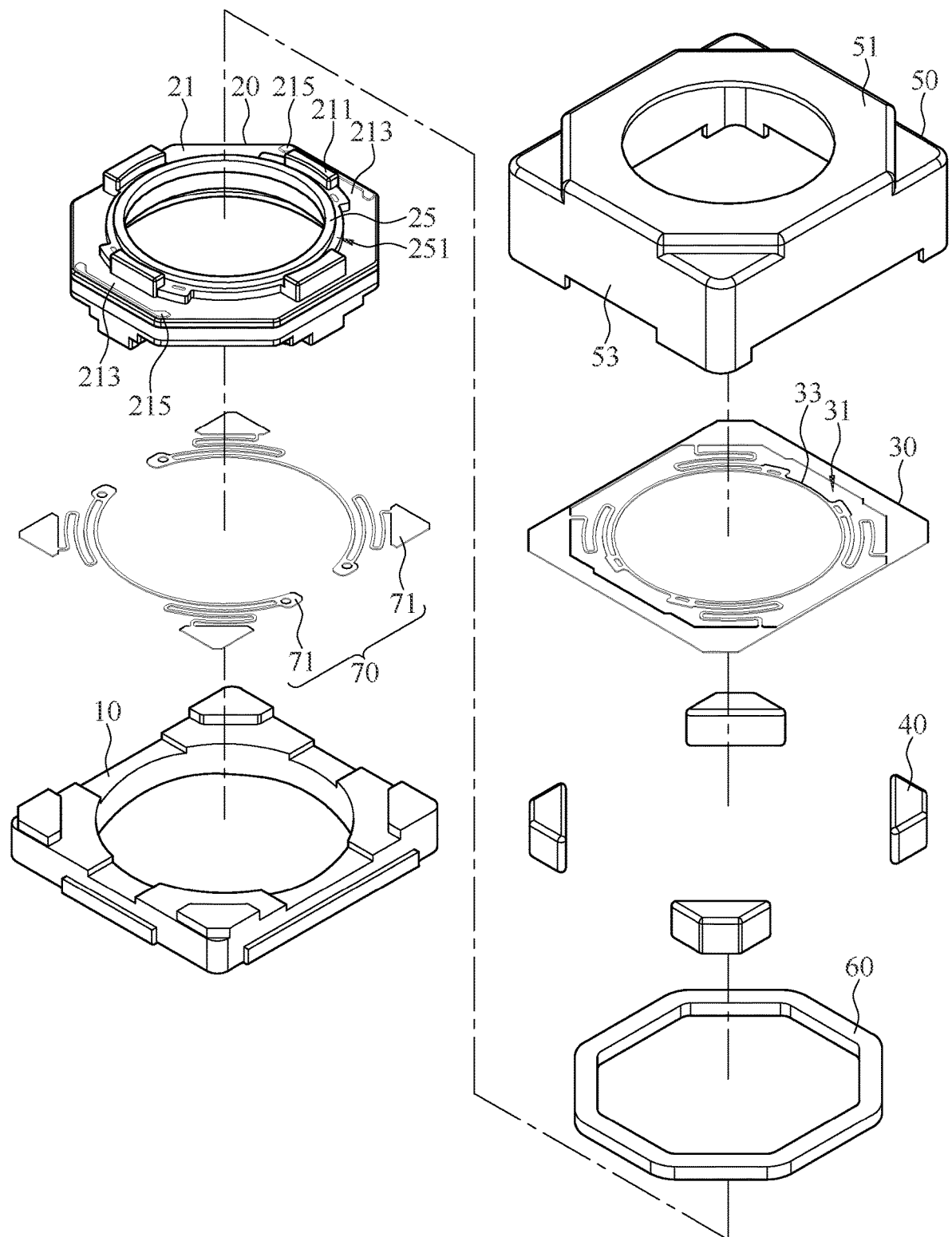
FIG. 2 illustrates a schematic exploded view of the anti-twist structure of voice coil motor according to the first embodiment of the present disclosure.

FIG. 1 illustrates a schematic perspective view of an anti-twist structure of voice coil motor according to the first embodiment of the present disclosure. FIG. 2 illustrates a schematic exploded view of the anti-twist structure of voice coil motor according to the first embodiment of the present disclosure. As shown in FIG. 1 and FIG. 2, the anti-twist structure 1 of voice coil motor of the first embodiment includes a base 10, a lens housing 20, an elastic sheet 30, a magnet 40, a yoke member 50, and a voice coil 60. The lens housing 20 is connected to the base 10. The lens housing 20 has a margin wall 21, and the margin wall 21 has a first protrusion 211 and a contact portion 213. The contact portion 213 is disposed at the outer periphery of the first protrusion 211. The elastic sheet 30 has a hollowed slot 31. The first protrusion 211 passes through the hollowed slot 31 so that the elastic sheet 30 is disposed on a portion of the margin wall 21 and on the contact portion 213. The magnet 40 is disposed on the base 10 and is located at one side of the lens housing 20. The magnet 40 is connected to the elastic sheet 30. In the present disclosure, the number of the magnet(s) 40 may be one or more than one. The magnet(s) 40 may be respectively disposed at the corner(s) of the base 10 and located at the outer periphery of the lens housing 20. The yoke member 50 has an upper wall 51 and a side wall 53. The side wall 53 is disposed at one side of the upper wall 51 and extends outward in a direction not parallel to the upper wall 51. In this embodiment, the side wall 53 extends outward in a direction perpendicular to the upper wall 51. The voice coil 60 is disposed around the outer peripheral edge of the lens housing 20. For instance, the voice coil 60 is engaged with the groove of the outer peripheral edge. The side wall 53 is connected to the base 10 so that the yoke member 50 surrounds the lens housing 20, the elastic sheet 30, the magnet 40, and the voice coil 60.

Please still refer to FIG. 2. The lens housing 20 further includes an inner flange 25. The inner flange 25 may extend from the margin wall 21 to the center of the lens housing 20. A groove 251 is disposed between the inner flange 25 and the first protrusion 211. The first extension arm 33 of the elastic sheet 30 is disposed in the groove 251. By such arrangement, the elastic sheet 30 is positioned by and between the inner flange 25 and the first protrusion 211, thereby preventing the elastic sheet 30 from being displaced or from falling off when the structure receives an external force or when the lens moves.

Figure 3:
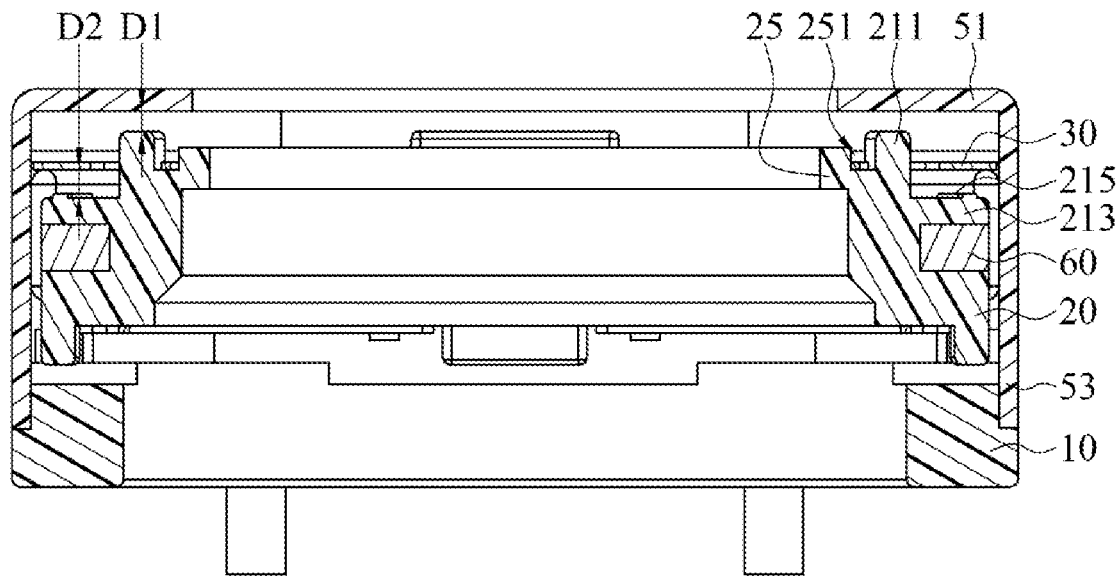
FIG. 3 illustrates a schematic cross-sectional view of the anti-twist structure of voice coil motor according to the first embodiment of the present disclosure.
Figure 4:
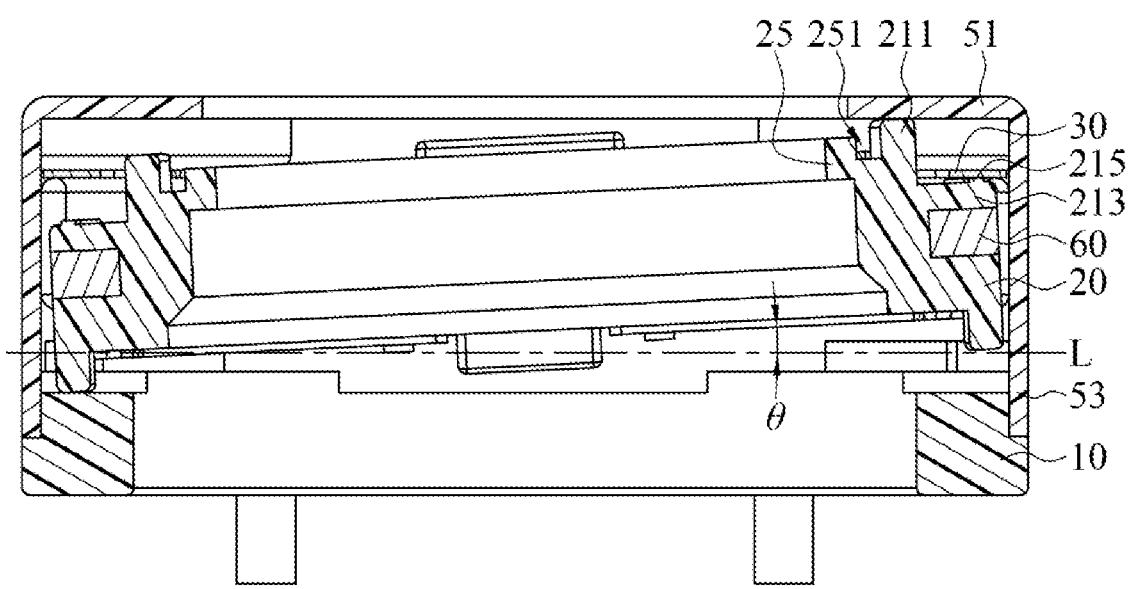
FIG. 4 illustrates a schematic cross-sectional view of the anti-twist structure of voice coil motor according to the first embodiment where the lens housing is in a deflected state.

FIG. 3 illustrates a schematic cross-sectional view of the anti-twist structure of voice coil motor according to the first embodiment of the present disclosure. FIG. 4 illustrates a schematic cross-sectional view of the anti-twist structure of voice coil motor according to the first embodiment where the lens housing 20 is in a deflected state. Please refer to FIG. 1, FIG. 2, and FIG. 3 at the same time. The schematic cross-sectional view shown in FIG. 3 is taken along the line A-A in FIG. 1. The lens housing 20 has a deflectable angle θ relative to the horizontal reference line L. The deflectable angle θ is the included angle between the lens housing 20 and the horizontal reference line L. The value of the deflectable angle θ may be 1 degree to 3 degrees, in particular, not greater than 2.7 degrees. Moreover, when the lens housing 20 deflects from the horizontal reference line L to the maximum value of the deflectable angle θ, the first protrusion 211 abuts against the bottom of the upper wall 51, and the contact portion 213 abuts against the elastic sheet 30 at the same time. Therefore, the lens housing 20 and the yoke member 50 interfere with each other. By the abutment between the first protrusion 211 and the yoke member 50, the elastic force of the elastic sheet 30 can help the lens housing 20 to move resiliently to its original position, thereby limiting the deflectable angle θ of the lens housing 20. Accordingly, the friction between the lens housing 20 and the yoke member 50 can be prevented, thereby reducing the production of abrasion debris, and preventing the lens housing 20 from being stuck.

The contact portion 213 has a second protrusion 215. The height of the second protrusion 215 is lower than that of the first protrusion 211. When the lens housing 20 deflects to the maximum value of the deflectable angle θ, the second protrusion 215 abuts against the elastic sheet 30.

Figure 5:
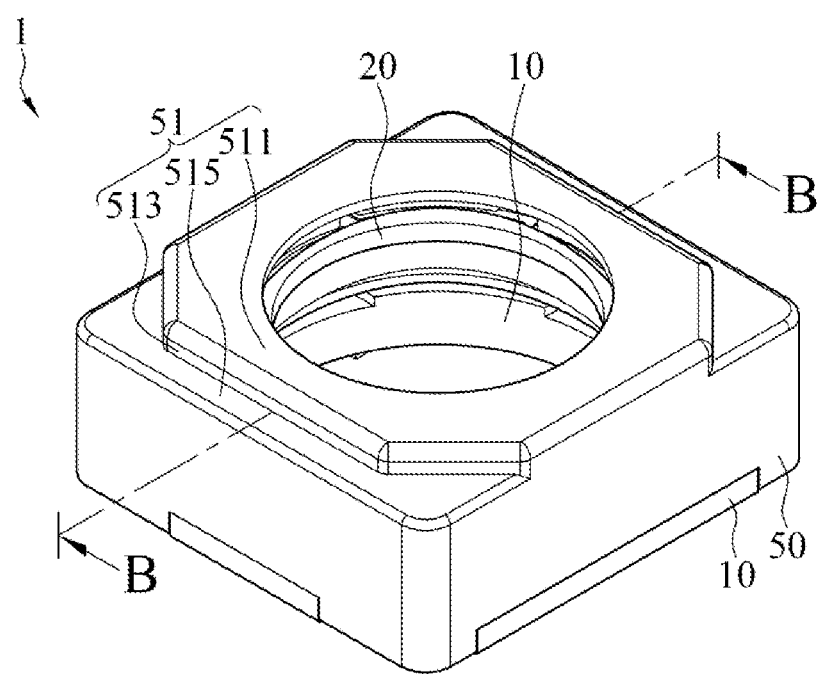
FIG. 5 illustrates a schematic perspective view of an anti-twist structure of voice coil motor according to the second embodiment of the present disclosure.
Figure 6:
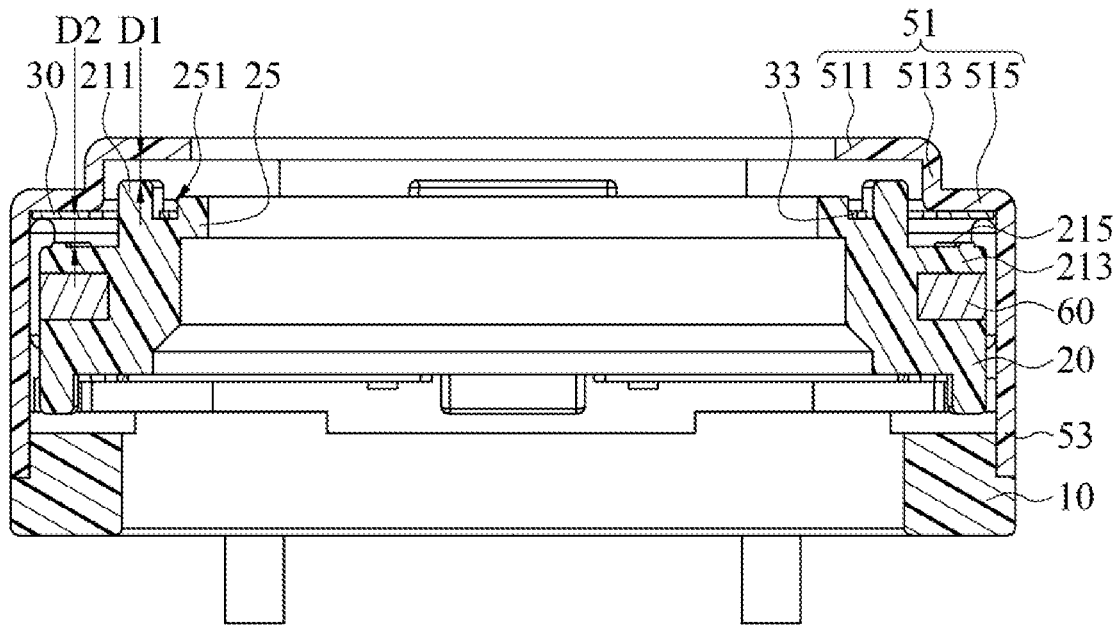
FIG. 6 illustrates a schematic cross-sectional view of the anti-twist structure of voice coil motor according to the second embodiment of the present disclosure.
Figure 7:
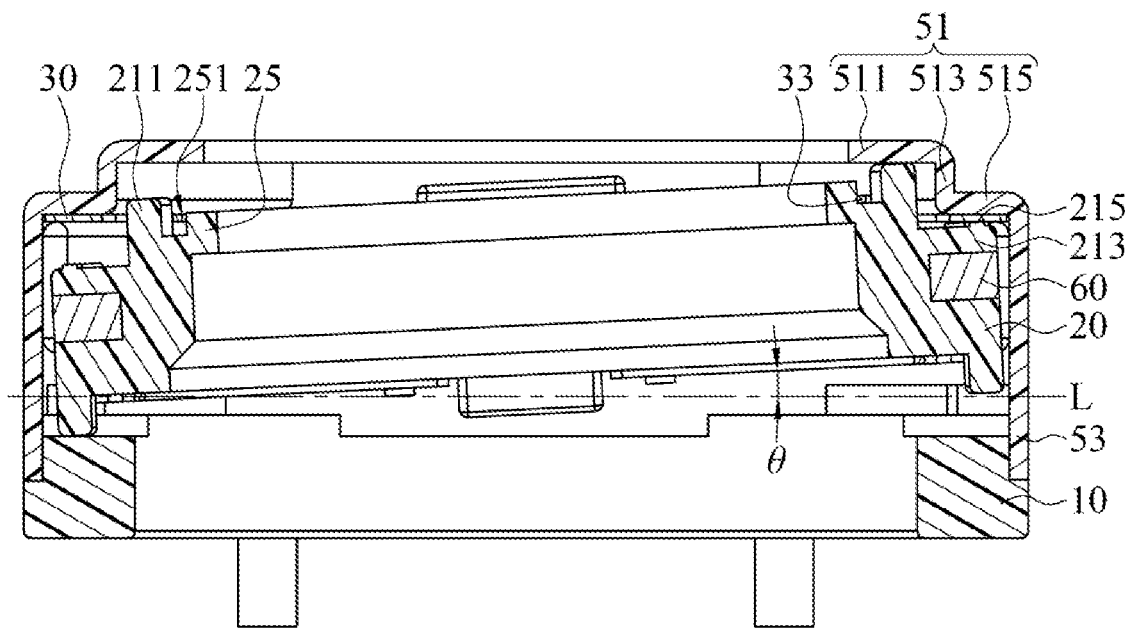
FIG. 7 illustrates a schematic cross-sectional view of the anti-twist structure of voice coil motor according to the second embodiment of the present disclosure where the lens housing is in a deflected state.

FIG. 5 illustrates a schematic perspective view of an anti-twist structure of voice coil motor according to the second embodiment of the present disclosure. FIG. 6 illustrates a schematic cross-sectional view of the anti-twist structure of voice coil motor according to the second embodiment of the present disclosure. FIG. 7 illustrates a schematic cross-sectional view of the anti-twist structure of voice coil motor according to the second embodiment where the lens housing 20 is in a deflected state. The schematic cross-sectional view shown in FIG. 6 is taken along the line B-B in FIG. 5. As shown in FIG. 5 to FIG. 7, one of the differences between the first embodiment and the second embodiment is that, in the second embodiment, the upper wall 51 of the yoke member 50 includes a first wall 511, a connection wall 513, and a second wall 515. The connection wall 513 extends from one side of the first wall 511 in a direction parallel to the side wall 53. The second wall 515 extends from one side of the connection wall 513 in a direction parallel to the first wall 511. Accordingly, a stepped structure is formed on the upper wall 51.

For the convenience of presentation, the yoke member 50 in FIG. 5 to FIG. 7 is presented in a bilaterally symmetrical manner (e.g. two sides of the yoke member 50 respectively have the stepped structure). However, it can be understood that, since the yoke member 50 can be formed by stamping, the stepped structure can be formed on only one side of the upper wall 51 of the yoke member 50 or on several sides of the upper wall 51 of the yoke member 50. That is, in some embodiments, the stepped structure of the yoke member 50 shown in the second embodiment and the structure of the yoke member 50 shown in the first embodiment may be both provided on the same yoke member 50. That is, in some embodiments, the yoke member 50 may have the stepped structure of the second embodiment and the structure of the first embodiment at the same time.

Furthermore, the second protrusion 215 is disposed on the contact portion 213 in the second embodiment. Therefore, when the lens housing 20 deflects to a maximum value of the deflectable angle θ, the first protrusion 211 abuts against the bottom of the first wall 511, the second protrusion 215 abuts against the elastic sheet 30 at the same time, and the elastic sheet 30 abuts against the bottom of the second wall 515. With this configuration, the elastic sheet 30 can prompt the lens housing 20 to move resiliently to its original position more effectively through the reaction force generated by abutting the second wall 515. To achieve this effect, the distance D1 between the first protrusion 211 and the first wall 511 is 0.13 mm to 0.15 mm, preferably, in some embodiments, 0.138 mm to 0.145 mm. The distance D2 between the second protrusion 215 and the elastic sheet 30 is 0.15 mm to 0.17 mm, preferably, in some embodiments, 0.162 mm to 0.168 mm. Similarly, the second protrusion 215 may also be provided on only one side or on several sides of the margin wall 21. In other words, in some embodiments, the structure of the second protrusion portion 215 of the lens housing 20 shown in the second embodiment and the structure of the second protrusion 215 of the lens housing 20 in the first embodiment may be both provided with one yoke member 50.

Figure 8:
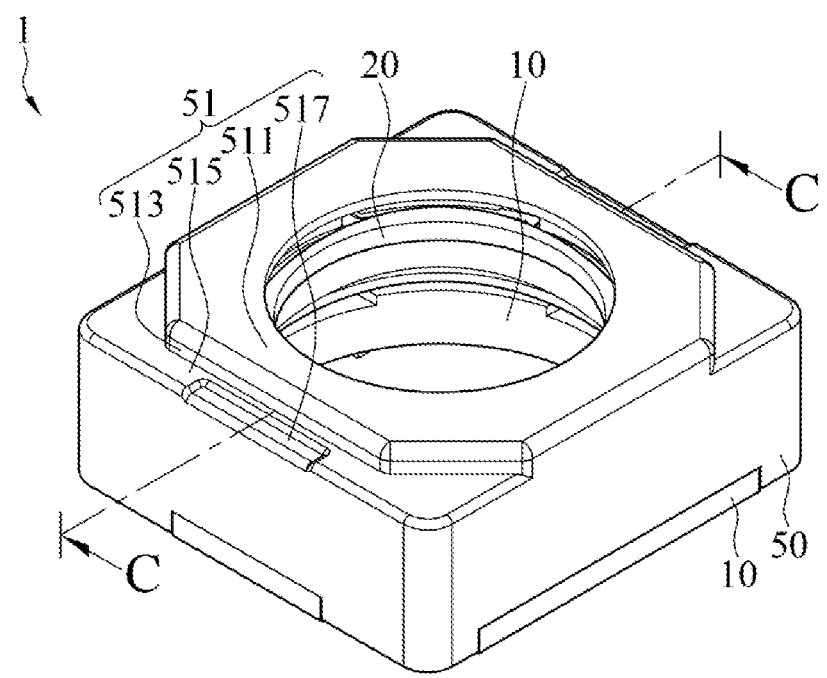
FIG. 8 illustrates a schematic perspective view of an anti-twist structure of voice coil motor according to the third embodiment of the present disclosure.
Figure 9:
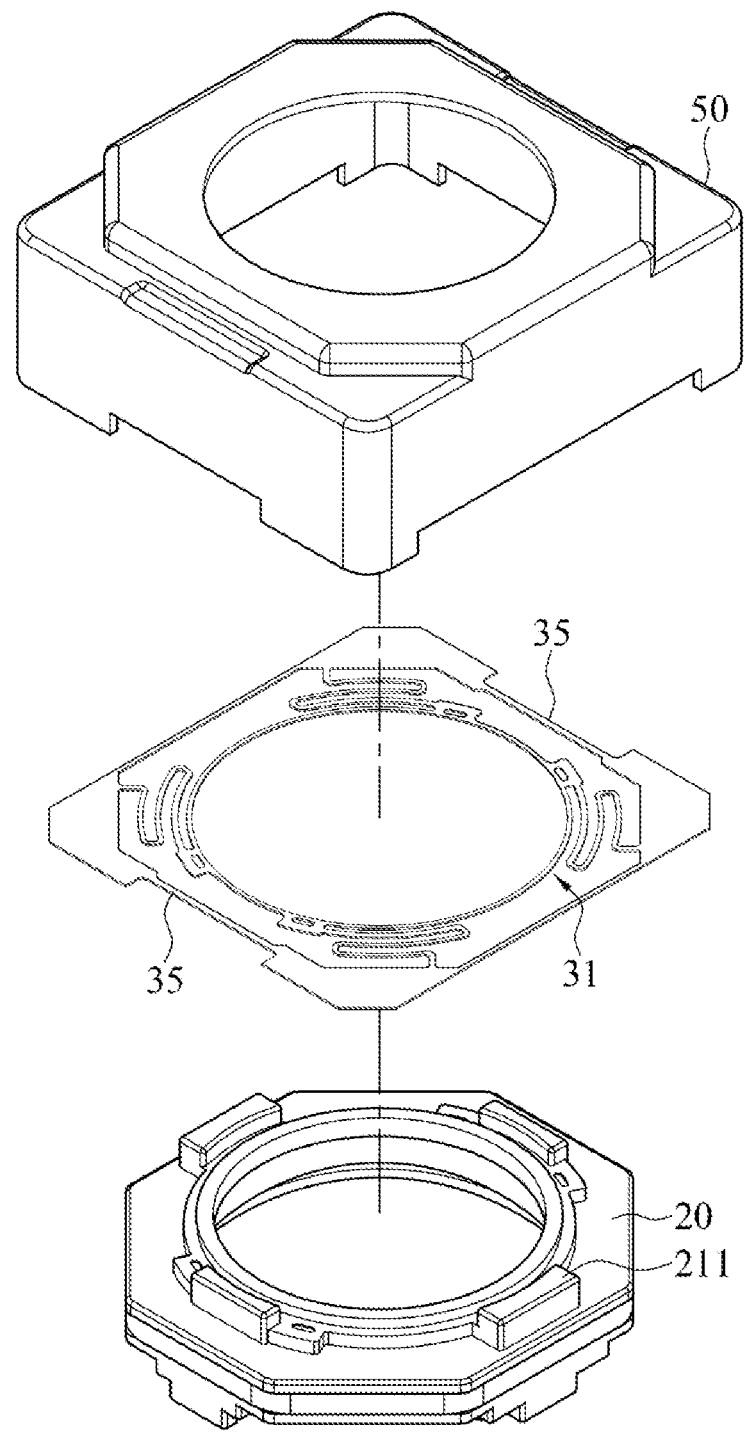
FIG. 9 illustrates a schematic partial exploded view of the anti-twist structure of voice coil motor according to the third embodiment of the present disclosure.
Figure 10:
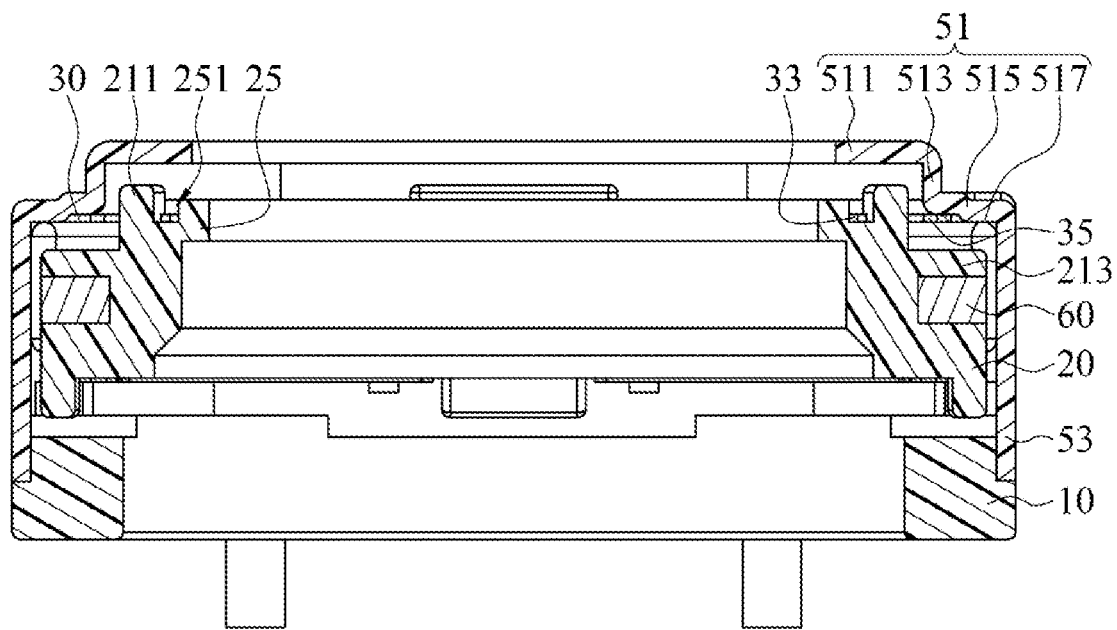
FIG. 10 illustrates a schematic cross-sectional view of the anti-twist structure of voice coil motor according to the third embodiment of the present disclosure.
Figure 11:
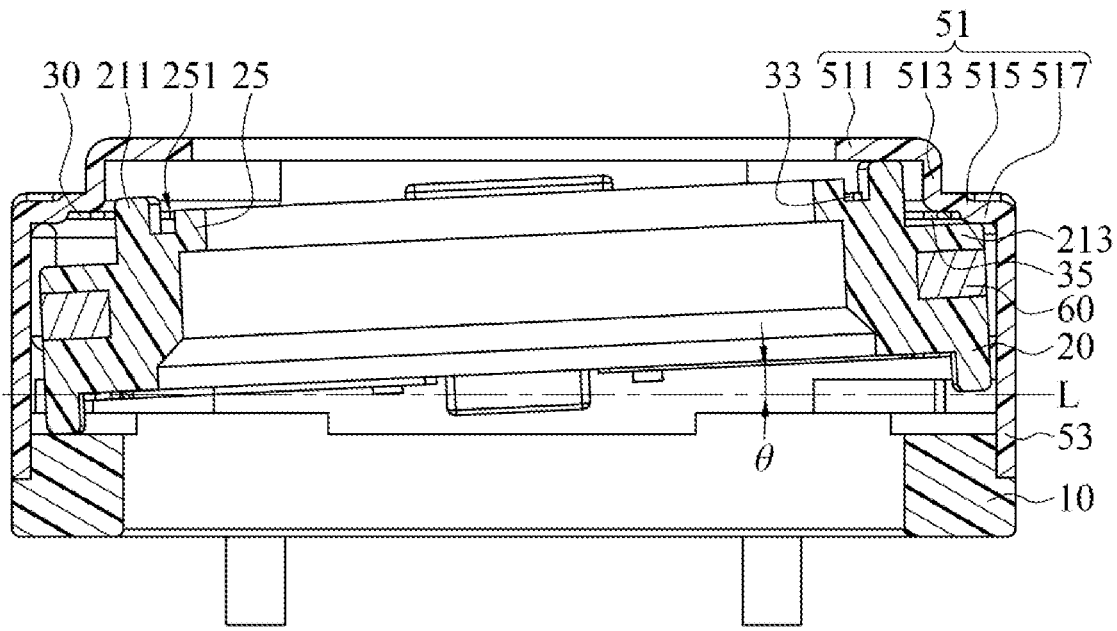
FIG. 11 illustrates a schematic cross-sectional view of the anti-twist structure of voice coil motor according to the third embodiment of the present disclosure where the lens housing is in a deflected state.

FIG. 8 illustrates a schematic perspective view of an anti-twist structure of voice coil motor according to the third embodiment of the present disclosure. FIG. 9 illustrates a schematic partial exploded view of the anti-twist structure of voice coil motor according to the third embodiment of the present disclosure. FIG. 10 illustrates a schematic cross-sectional view of the anti-twist structure of voice coil motor according to the third embodiment of the present disclosure. FIG. 11 illustrates a schematic cross-sectional view of the anti-twist structure of voice coil motor according to the third embodiment of the present disclosure where the lens housing 20 is in a deflected state. The schematic cross-sectional view shown in FIG. 10 is taken along the line C-C in FIG. 8. In order to show the difference more clearly, only the lens housing 20, the elastic sheet 30, and the yoke member 50 are illustrated in FIG. 9, and other components are omitted.

As shown in FIG. 8 and FIG. 11, the upper wall 51 of the yoke member 50 in the third embodiment also has the stepped structure shown in the second embodiment. The difference is that, in the third embodiment, the bottom of the second wall 515 further has a bump 517. The height of the bump 517 is lower than the height of the first protrusion 211. No second protrusion 215 is disposed on the contact portion 213 in this embodiment. When the lens housing 20 deflects to a maximum value of the deflectable angle θ, the first protrusion 211 abuts against the bottom of the first wall 511, and the bump 517 abuts against the contact portion 213 at the same time. Here, the deflectable angle θ of the lens housing 20 is further restricted by the interference between the components.

Similarly, for the convenience of presentation, the yoke member 50 in the FIG. 8 to FIG. 11 is presented in a bilaterally symmetrical manner. However, it can be understood that, the upper wall 51 and the bump 517 of the stepped structure shown in the third embodiment may be formed on only one side of the yoke member 50 or on several sides of the yoke member 50. In other words, in some embodiments, the upper wall 51 and the bump 517 of the stepped structure of the yoke member 50 shown in the third embodiment and the structure of the yoke member 50 shown in the first embodiment may be provided on the same yoke member 50.

In the third embodiment, the elastic sheet 30 has a second extension arm 35 located between the bump 517 and the first protrusion 211. The second extension arm 35 can be regarded as an avoidance structure for the bump 517. With the avoidance structure, the width of the elastic piece 30 is reduced so as to maintain the installation tolerance. However, this configuration is only an illustrative example and is not limitations to embodiments of the present disclosure. In some embodiments, a slot structure may be provided as the avoidance structure for the bump 517 and still achieves the effect of maintaining the installation tolerance. In this embodiment, the second extension arm 35 is spaced apart from the bump 517, but is not limited thereto. In some other embodiments, the second extension arm 35 may directly contact the bump 517. Moreover, for the convenience of presentation, the elastic sheet 30 in the FIG. 8 to FIG. 11 is presented in a bilaterally symmetrical manner. However, it can be understood that the second extension arm 35 can be formed on only one side of the elastic sheet 30 or on several sides of the elastic sheet 30.

Figure 12:
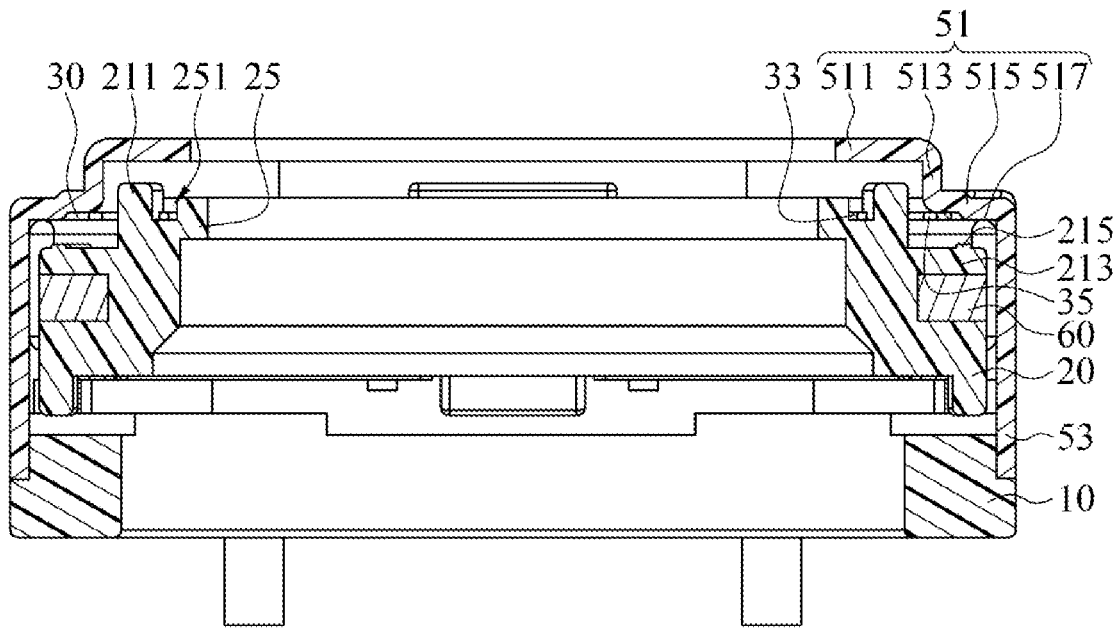
FIG. 12 illustrates a schematic cross-sectional view of an anti-twist structure of voice coil motor according to the fourth embodiment of the present disclosure.
Figure 13:
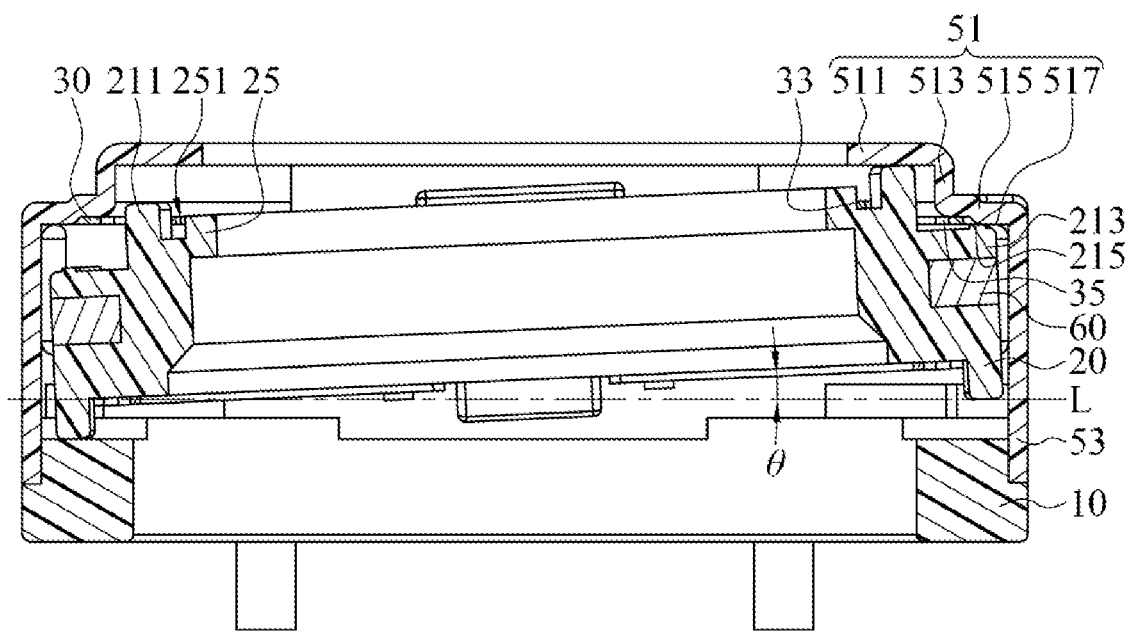
FIG. 13 illustrates a schematic cross-sectional view of the anti-twist structure of voice coil motor according to the fourth embodiment of the present disclosure where the lens housing is in a deflected state.

FIG. 12 illustrates a schematic cross-sectional view of an anti-twist structure of voice coil motor according to the fourth embodiment of the present disclosure. FIG. 13 illustrates a schematic cross-sectional view of the anti-twist structure of voice coil motor according to the fourth embodiment of the present disclosure where the lens housing 20 is in a deflected state. As shown in FIG. 12 and FIG. 13, the structure of voice coil motor in the fourth embodiment combines the structures of the second embodiment and third embodiment. In the fourth embodiment, the contact portion 213 has a second protrusion 215, and the bottom of the second wall 515 has the bump 517. When the lens housing 20 deflects to a maximum value of the deflectable angle θ, the first protrusion 211 abuts against the bottom of the first wall 511, and the second protrusion 215 abuts against the bump 517 at the same time. Here, the deflectable angle θ of the lens housing 20 is further restricted by the interference between the components.

Similarly, for the convenience of presentation, the yoke member 50 in the FIG. 12 and FIG. 13 is presented in a bilaterally symmetrical manner. However, it can be understood that the upper wall 51 and the bump 517 of the stepped structure can be formed on only one side of the yoke member 50 or on several sides of the yoke member 50, and the second protrusion 215 can be formed correspondingly on only one side of the lens housing 20 or on several sides of the lens housing 20. That is, in some embodiments, the stepped structure of the yoke member 50 shown in the fourth embodiment and the structure of the yoke member 50 shown in the first embodiment may be provided on the same yoke member 50, and structure of the second protrusion 215 of the lens housing 20 shown in the fourth embodiment and the structure of the second protrusion 215 of the lens housing 20 shown in the first embodiment may be provided on the same lens housing 20. Furthermore, in the third embodiment and the fourth embodiment, the bump 517 on the second wall 515 of the yoke member 50 can be formed by further recessing the second wall 515. Similarly, in the fourth embodiment, the elastic sheet 30 has a second extension arm 35, and the second extension arm 35 is disposed between the bump 517 and the first protrusion 211.

Please refer back to FIG. 2. The anti-twist structure 1 of voice coil motor may further include a second elastic sheet 70. The second elastic sheet 70 is disposed between the base 10 and the lens housing 20. The elastic sheet 30 and the second elastic sheet 70 are respectively disposed at the upper side and the lower side of the lens housing 20. Moreover, the second elastic sheet 70 may further include a group of second elastic arms 71 which are arranged in a mirror symmetry, and one side of each of the second elastic arms 71 may be fixed to the lens housing 20. With this structure, elastic force can also be provided on the other side of the lens housing 20 opposite to the elastic sheet 30, so that the lens housing 20 can be moved resiliently to its original position more quickly when the lens housing 20 deflects at a small angle.

To sum up, according to one or some embodiments of the present disclosure, by having the first protrusion 211 and the contact portion 213 corresponding to the yoke member 50 on the lens housing 20, the anti-twist structure 1 of voice coil motor can limit the elevation of the lens or the deflectable angle θ when it is subjected to an external force. Moreover, according to one or some embodiments of the present disclosure, with the elastic sheet 30, the lens housing 20 can be quickly moved resiliently to its original position when a small angle deflection occurs, thereby ensuring the service life of the overall lens module.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An anti-twist structure of voice coil motor, comprising:
   a base;
   a lens housing connected to the base, wherein the lens housing has a margin wall and an inner flange, and the margin wall has a first protrusion, a second protrusion, and a contact portion, wherein the contact portion is extended outwardly from an outer periphery of the first protrusion, a groove is disposed between the inner flange and the first protrusion, and the second protrusion is protruded from the contact portion, and a height of the second protrusion is lower than a height of the first protrusion, wherein the first protrusion and the second protrusion are protruded along an axial direction substantially perpendicular to the margin wall;
   an elastic sheet having a hollowed slot, wherein the first protrusion passes through the hollowed slot so that the elastic sheet is disposed on a portion of the margin wall and on the contact portion, wherein elastic sheet comprises a first extension arm in the hollow slot, and the first extension arm is disposed in the groove;
   a magnet disposed on the base and located at one side of the lens housing, wherein the magnet is connected to the elastic sheet; and
   a yoke member having an upper wall and a side wall, wherein the side wall is disposed at one side of the upper wall and the side wall extends outward in a direction not parallel to the upper wall, and wherein the yoke member is connected to the base so that the yoke member surrounds the lens housing, the elastic sheet, and the magnet;

wherein the lens housing has a deflectable angle relative to a horizontal reference line, and the deflectable angle is an included angle between the lens housing and the horizontal reference line; and wherein when the lens housing deflects from the horizontal reference line to a maximum value of the deflectable angle, a top surface of the first protrusion abuts against a bottom surface of the upper wall, and the contact portion abuts against the elastic sheet or the bottom surface of the upper wall at the same time, whereby the lens housing and the yoke member interfere with each other, and wherein when the lens housing deflects to the maximum value of the deflectable angle, the second protrusion abuts against the elastic sheet.

2. The anti-twist structure of voice coil motor according to claim 1, wherein the deflectable angle is not greater than 2.7 degrees.

\* \* \* \* \*